Aug. 29, 1939.  W. L. CHAMBERS  2,170,987
CONVERTIBLE CAMP BED AND LUGGAGE CARRIER
Filed Jan. 24, 1938  3 Sheets-Sheet 2
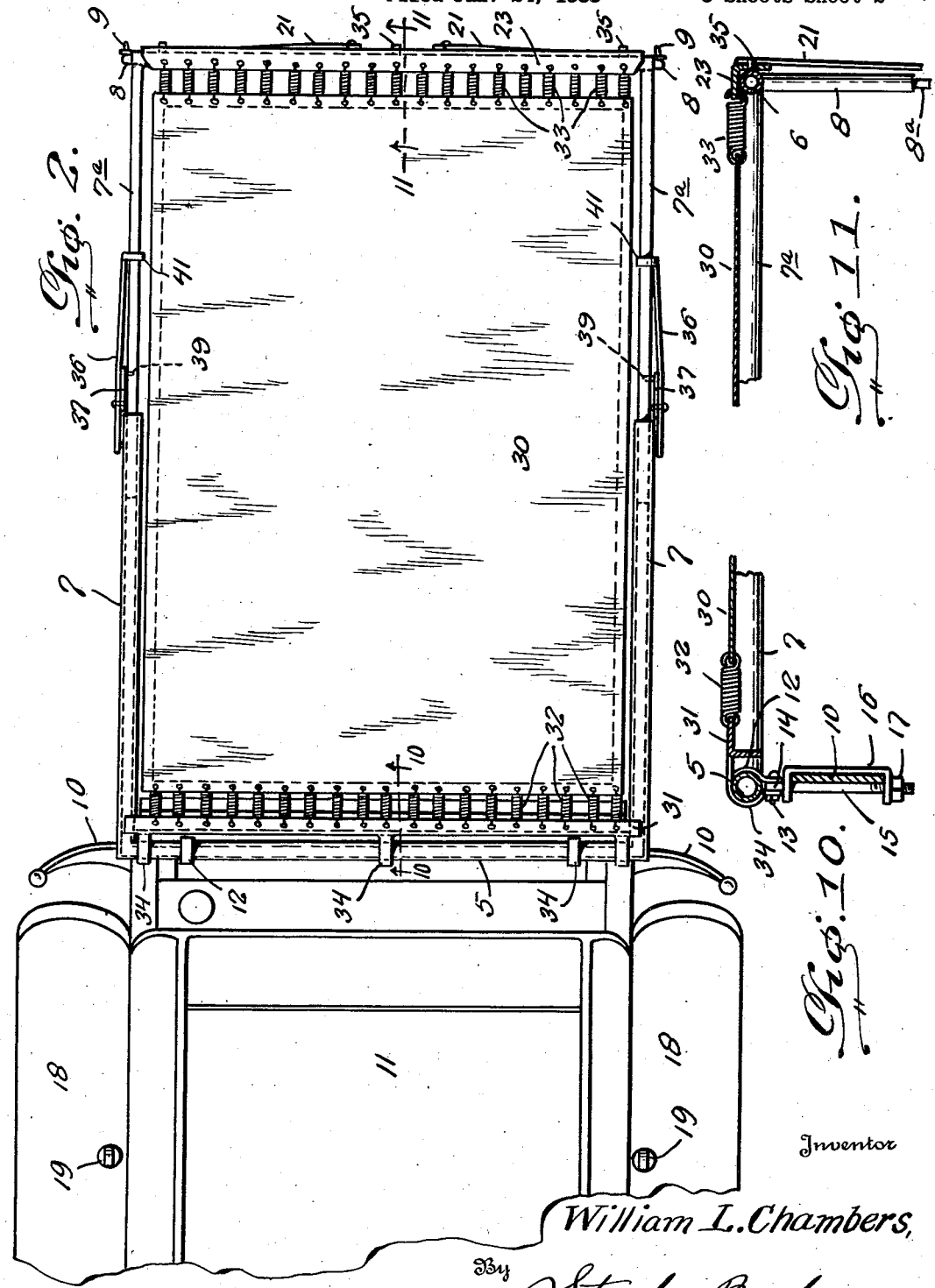

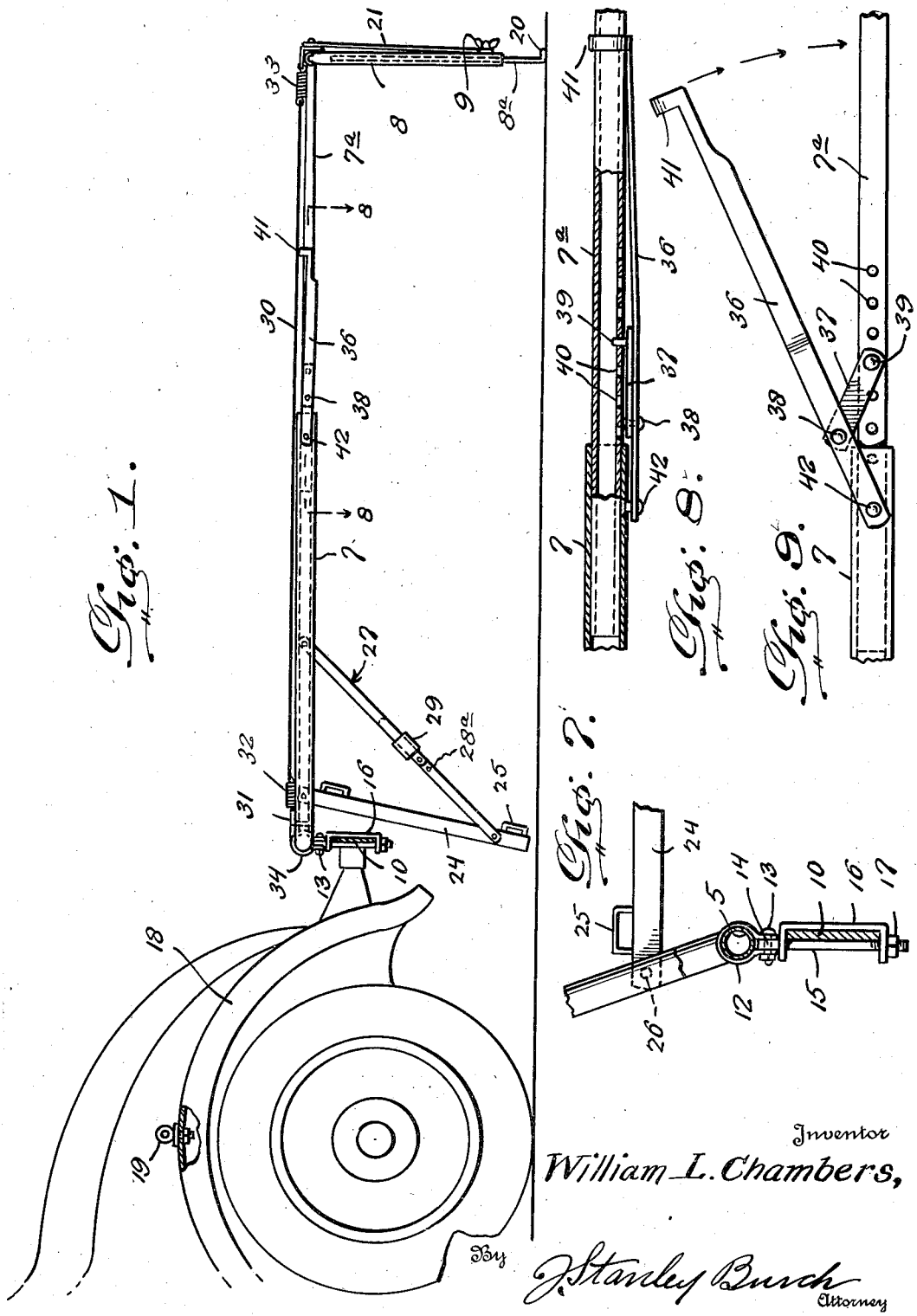

Aug. 29, 1939.  W. L. CHAMBERS  2,170,987
CONVERTIBLE CAMP BED AND LUGGAGE CARRIER
Filed Jan. 24, 1938  3 Sheets-Sheet 3
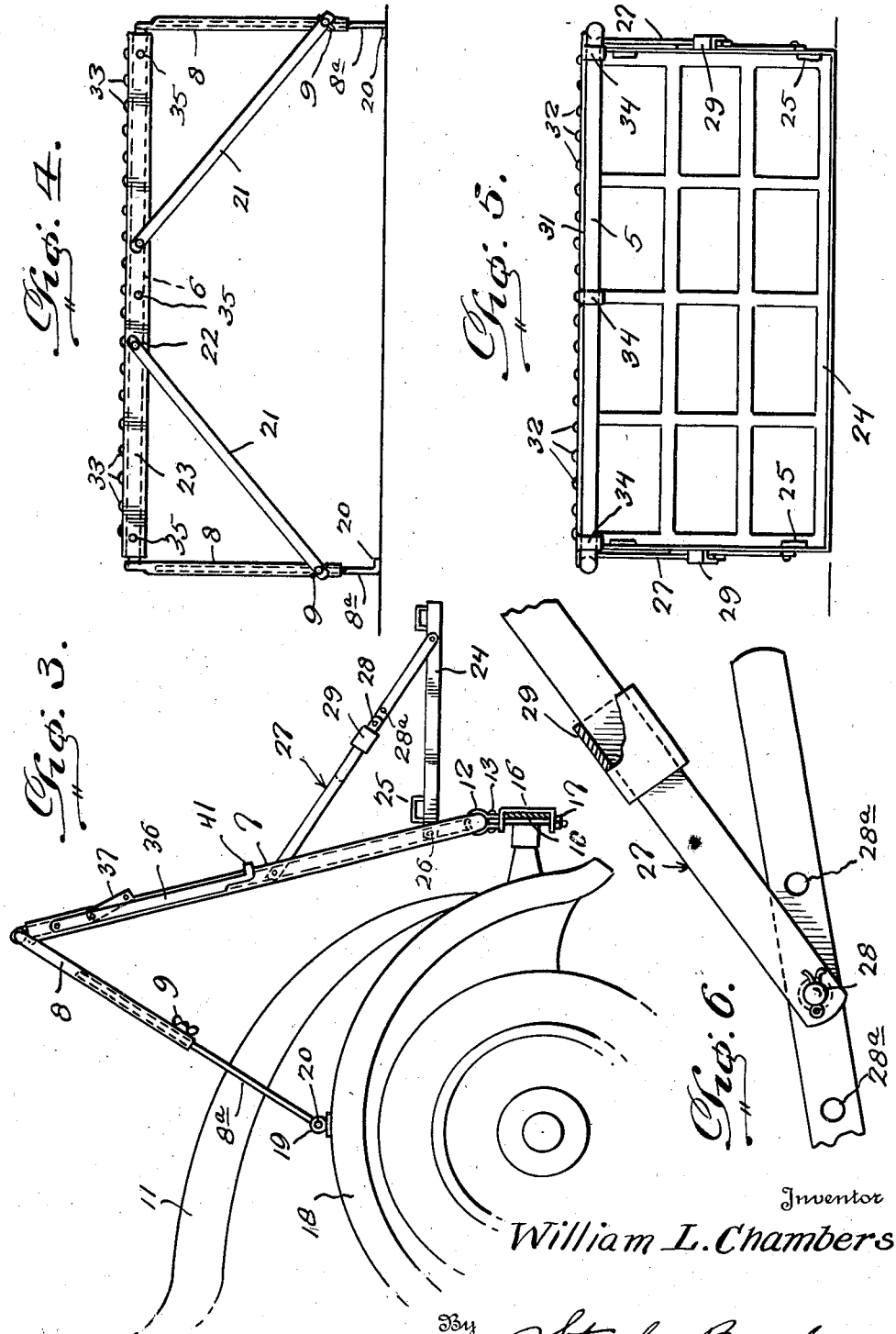
Inventor
William L. Chambers,
By J. Stanley Burch
Attorney Patented Aug. 29, 1939

2,170,987

UNITED STATES PATENT OFFICE

2,170,987

CONVERTIBLE CAMP BED AND LUGGAGE CARRIER

William L. Chambers, Ogden, Utah

Application January 24, 1938, Serial No. 186,713

4 Claims. (Cl. 5—119)

This invention relates to a novel and useful attachment for automobiles adapted to be readily converted for use either as a luggage carrier or a camp bed.

An object of the present invention is to provide a device of the above kind including an extensible and collapsible bed frame hingedly mounted at one end upon the automobile bumper to swing rearwardly and downwardly in position for use as a bed when desired, and to swing upwardly and forwardly when use of the device as a bed is not desired, means being provided to support the other or rear end of the bed frame when placed in either position, a luggage carrier or rack being carried by the first-named or forward end of the bed frame in a position to project rearwardly for receiving and supporting luggage when the bed frame is in its upwardly and forwardly swung position.

More specifically, the present invention provides a device of the above kind in which the supporting means for the rear end of the bed frame is adjustable in length to engage the ground and support said rear end of the bed frame at the desired elevation when in its rearwardly and downwardly swung position, means being provided to releasably connect said supporting means with the rear fenders of the automobile so as to secure the bed frame in its forwardly and upwardly swung position when collapsed.

A further object is to provide a device of the above kind including a bed bottom removably associated with the bed frame, and means for placing and securing the bed bottom under longitudinal tension when applied to the bed frame with the latter extended and positioned for use.

With the above and other objects in view, the present invention consists in the novel form, combination and arrangement of parts hereinafter more fully described, shown in the accompanying drawings and claimed.

In the drawings:

Figure 1 is a view partly in side elevation and partly in section showing the rear end of an automobile equipped with a convertible bed and luggage carrier constructed in accordance with the present invention, the device being disposed for use as a bed.

Figure 2 is a top plan view of the construction as shown in Figure 1.

Figure 3 is a view similar to Figure 1 with the device positioned for use as a luggage carrier.

Figure 4 is an end elevation looking toward the left of Figure 1.

Figure 5 is a view similar to Figure 4 looking toward the other or forward end of the device as it appears when positioned as in Figure 1 but detached from the automobile.

Figure 6 is an enlarged fragmentary view partly in elevation and partly in section, showing the connection between the sections of the folding braces provided between the luggage carrier and the bed frame.

Figure 7 is a fragmentary sectional view of a portion of the device positioned as in Figure 3, showing more clearly the manner of hinging the bed frame to the automobile bumper.

Figure 8 is a fragmentary view partly in plan and partly in longitudinal section, showing the manner in which the side rails of the bed frame are constructed of telescopic sections, and illustrating the means for placing and securing the bed bottom under longitudinal tension.

Figure 9 is a side elevational view of the construction as shown in Figure 8 with the lever of the tensioning means raised.

Figure 10 is a fragmentary vertical longitudinal section taken on line 10—10 of Figure 2; and Figure 11 is a view similar to Figure 10 taken on line 11—11 of Figure 2.

Referring in detail to the drawings, the illustrated embodiment of the present invention includes a longitudinally extensible and collapsible bed frame, preferably of tubular form and composed of end rails 5 and 6 and side rails each consisting of telescopically associated sections 7 and 7a. Hinged at opposite ends of the rear end rail 6 of the bed frame are supporting legs which are adjustable in length and each composed of telescopically associated sections 8 and 8a having means including a wing nut 9 for securing them in adjusted relation. These supporting legs are hinged to swing about axes coincident with the longitudinal axis of end rail 6.

Means is provided for mounting the other or forward end of the bed frame upon the rear bumper 10 of an automobile generally indicated at 11, and this means preferably consists of bearings 12 attached to the bumper 10 near the ends of the latter and rotatably receiving the forward end rail 5 of the bed frame adjacent the ends of said rail 5. Each bearing 12 consists of a split sleeve bolted for lateral tilting movement as at 13 to an eye 14 provided on the upper end of a stem 15, stem 15 being vertically disposed at the forward side of bumper 10 and being secured thereto by means of a U-clamp 16 having the stem 15 passed through the legs thereof and secured by means of a nut 17 threaded on the lower end of stem 15 beneath the lower leg of said clamp 16. In this way and by this means, the bed frame is mounted so that the same may be swung rearwardly and downwardly to a susbtantially horizontal position when the device is desired for use as a bed, as illustrated in Figures 1 and 2. Also, the bed frame may be longitudinally collapsed and swung rearwardly and upwardly to the position shown in Figure 3 when use of the device as a bed is not desired. In the first position, the legs 8, 8a may be swung to a position so as to extend downwardly from the rear end of the bed frame and engage the ground for supporting said rear end of the bed frame at the desired elevation. On the other hand, when the bed frame is collapsed and swung to the position of Figure 3, it may be sustained in that position by the legs 8 and 8a, provision being made for detachably connecting the free ends of legs 8, 8a with the rear fenders 18 of the automobile. This is accomplished by providing the fenders 18 with eye bolts 19 in which are releasably engageable the laterally directed free ends 20 of the outer sections 8a of said legs. These laterally directed ends 20 may be readily engaged in the eyes of bolts 19 or disengaged therefrom by simply springing the outer leg sections 8a laterally. In order to sustain the legs 8, 8a in a vertical position when disposed as in Figure 1 to support the rear end of the bed frame, I provide detachable braces 21 extending diagonally between the intermediate portion of the rear end rail 6 and the lower end of the inner sections 8 of said legs, the braces 21 being detachably engaged at their lower ends beneath the wing nut 9 and being pivoted at 22 at their upper ends to an angle bar 23 removably associated with the rear end rail 6 as will be presently described.

Arranged between and hinged at its forward end to the side rails of the bed frame adjacent the forward end of the latter is a luggage rack 24 which may be disposed flush with the side rails when not in use by swinging the same upwardly and forwardly between said side rails of the bed frame from the position of Figure 3, or which may be disposed to project rearwardly from the bed frame to act as a luggage carrier when swung rearwardly and downwardly to the position of Figure 3. This luggage rack is preferably in the form of a grid provided with a marginal reinforcing flange and provided at suitable points along its marginal flange with strap-receiving loops 25 to facilitate strapping of luggage on said rack. The hinge for the rack 24 is indicated at 26, and foldable braces 27 are provided between the free outer or rear end of rack 24 and the side rails of the bed frame so as to sustain the rack 24 in outwardly swung position as shown in Figures 1 and 3. As shown more clearly in Figure 6, the braces 27 may consist of hingedly connected sections, the inner end of one section being pivoted to the other section at a point removed from the inner end of the latter as at 28, the first-named section being provided with a sliding sleeve 29 which may be disposed over the overlapping ends of said brace sections to maintain them in alinement and bracing relation. By sliding the sleeve 29 off of the adjacent projecting end of the brace section having the pivot 28 removed from its inner end, the sections may be swung relative to each other for collapsing the braces and permitting the rack 24 to swing upwardly between the side rails of the bed frame out of the way when not in use. It will be noted that when the rack 24 is operatively disposed or in its outwardly swung position, it may be used to support the forward end of the bed frame in case the latter is detached from the automobile bumper, thus permitting use of the bed when it is desired to use the automobile without disturbing the occupant of the bed or without moving the bed from the point where a camp has been made.

The present invention also includes a bed bottom which may consist of a sheet of canvas 30 having transverse bars 31 and 23 connected to the opposite ends thereof by means of a series of helical tension springs 32 and 33, respectively. The bar 31 is provided with a plurality of spaced forwardly projecting hooks 34 adapted to engage over the forward end rail 5 of the bed frame for connecting the forward end of the bed bottom to said frame. The rear end rail 6 is provided with rearwardly projecting pins 35 arranged to be received in perforations provided in the rear depending flange of bar 23 whereby the latter is detachably connected to the rear end rail 6 of the bed frame. It will thus be seen that the bed bottom may be readily applied or removed as occasion demands.

Means is provided for causing additional longitudinal extension of the bed frame after the bed bottom has been applied thereto so as to place and secure the bed bottom under longitudinal tension whereby it will not unduly sag when in use. For this purpose, a lever 36 is hinged to the inner end of each side rail section 7 of the bed frame and has a link 37 pivoted thereto as at 38 near the pivoted end of said lever 36, the link 37 having a pin 39 adopted for selective engagement in any desired one of a longitudinal series of openings 40 provided in the adjacent portion of the associated side rail section 7a. Thus, if the bed bottom is applied to the bed frame with the latter extended so that the bed bottom will be substantially taut, downward pressure upon the levers 36 will result in additional extension of the bed frame so as to place the bed bottom under sufficient longitudinal tension to prevent sagging of said bed bottom when occupied by a sleeper. Of course, the lever 36 and link 37 operate on the toggle lever principle, the link 37 being disposed in diverging relation to the lower pivoted end of lever 36 when in use. The free end of each lever 36 has a laterally extending curved extension 41 adapted to abut and snugly embrace the adjacent side rail section 7a for limiting the downward swinging movement of said lever to a position wherein the same is alined with the side rail sections 7 and 7a. The pivot 38, when the lever 36 is disposed in downwardly swung position, is disposed slightly below the pin 39 or a line intersecting said pin and the pivot 42 of lever 36, thereby insuring that the lever 36 will remain in its downwardly swung position until manually raised for partially collapsing the bed frame and permitting removal of the bed bottom. In the latter operation, the hooks 34 are simply disengaged from the end rail 5, whereupon the bar 23 is disengaged from pins 35 pursuant to disconnection of the braces 21 from the legs 8, 8a.

From the foregoing description, it is believed that the construction and manner of use, as well as the advantages of the present invention, will be readily understood and appreciated by those skilled in the art. While I have disclosed specific details of what is now believed to be the preferred embodiment of the present invention, it will be apparent that the invention is susceptible of minor changes and other specific embodiments without departing from the spirit and scope of the invention as claimed. Braces 27 are preferably adjustable in length so that the luggage rack may be readily adjusted to a horizontal position regardless of the type of automobile on which the invention is installed. For this purpose, pivot 28 may be removable and may be entered in any desired one of a longitudinal series of openings 28a provided in one section of brace 27.

What I claim as new is:

1. In combination with a motor vehicle having rear mud guards and a rear bumper, a longitudinally extensible and collapsible bed frame pivotally mounted at its forward end upon said rear bumper for rearward and downward swinging movement to a substantially horizontal position for use when extended, and rearwardly and upwardly to a susbtantially upright position when collapsed and not required for use, rear supporting legs for said bed frame pivoted to the latter upon transverse axes so as to permit said legs to extend forwardly and downwardly to said rear mud guards when the bed frame is in the second-named position, and means to detachably connect said legs to the mud guards for retaining the bed frame in said second position.

2. In combination with a motor vehicle having rear mud guards and a rear bumper, a longitudinally extensible and collapsible bed frame pivotally mounted at its forward end upon said rear bumper for rearward and downward swinging movement to a substantially horizontal position for use when extended, and rearwardly and upwardly to a substantially upright position when collapsed and not required for use, rear supporting legs for said bed frame pivoted to the latter upon transverse axes so as to permit said legs to extend forwardly and downwardly to said rear mud guards when the bed frame is in the second-named position, and means to detachably connect said legs to the mud guards for retaining the bed frame in said second position, a luggage rack pivotally mounted between the sides of the bed frame near the forward end of the latter for swinging movement to a substantially horizontal rearwardly projecting position for use when the bed frame is in said second-named position.

3. In combination with a motor vehicle having rear mud guards and a rear bumper, a longitudinally extensible and collapsible bed frame pivotally mounted at its forward end upon said rear bumper for rearward and downward swinging movement to a susbtantially horizontal position for use when extended, and rearwardly and upwardly to a substantially upright position when collapsed and not required for use, rear supporting legs for said bed frame pivoted to the latter upon transverse axes so as to permit said legs to extend forwardly and downwardly to said rear mud guards when the bed frame is in the second-named position, means to detachably connect said legs to the mud guards for retaining the bed frame in said second position, a luggage rack pivotally mounted between the sides of the bed frame near the forward end of the latter for swinging movement to a substantially horizontal rearwardly projecting position for use when the bed frame is in said second-named position, and foldable braces for sustaining the luggage rack in said horizontal position for use or permitting upward and forward swinging movement of the luggage rack to a position between the sides of the bed frame when not required for use.

4. In combination with a motor vehicle having rear mud guards and a rear bumper, a longitudinally extensible and collapsible bed frame pivotally mounted at its forward end upon said rear bumper for rearward and downward swinging movement to a substantially horizontal position for use when extended, and rearwardly and upwardly to a susbtantially upright position when collapsed and not required for use, rear supporting legs for said bed frame pivoted to the latter upon transverse axes so as to permit said legs to extend forwardly and downwardly to said rear mud guards when the bed frame is in the second-named position, means to detachably connect said legs to the mud guards for retaining the bed frame in said second position, a luggage rack pivotally mounted between the sides of the bed frame near the forward end of the latter for swinging movement to a substantially horizontal rearwardly projecting position for use when the bed frame is in said second-named position, foldable braces for sustaining the luggage rack in said horizontal position for use or permitting upward and forward swinging movement of the luggage rack to a position between the sides of the bed frame when not required for use, said luggage rack being adapted to support the forward end of the bed frame when swung outwardly from between the sides of the latter with the bed frame detached from the bumper.

WILLIAM L. CHAMBERS.